United States

Zafiropulo et al.

Re. 28,958

:d Sept. 7, 1976

[54] SYNCHRONOUS DISCONNECTION AND REARRANGEMENT

[75] Inventors: Pietro Alois Zafiropulo, Horgen; Franz Xaver Zihlmann, Thalwill both of Switzerland

[73] Assignee: International Business Machines Corporation, Armonk, N.Y.

[22] Filed: Oct. 6, 1975

[21] Appl. No.: 619,997

Related U.S. Patent Documents

Reissue of:

[64] Patent No.: 3,876,983
Issued: Apr. 8, 1975
Appl. No.: 464,890
Filed: Apr. 29, 1974

[30] Foreign Application Priority Data

May 30, 1973 Switzerland ..... 7783/73

[52] U.S. Cl. ..... 340/147 SC; 179/15 AL
[51] Int. Cl.[2] ..... H04Q 9/00; H04J 3/14
[58] Field of Search..... 340/147 R, 147 SC, 147 P; 178/69; 179/15 AL

[56] References Cited

UNITED STATES PATENTS 3,519,750 8/1967 Beresin et al..... 179/15 AL
3,601,806 8/1971 Heimbigner ..... 340/147 PC
3,716,834 2/1973 Adams ..... 340/147 SC

OTHER PUBLICATIONS

E. E. Mallar et al., "Communication Link Between a Loop System and a Remote Loop," IBM Technical Disclosure Bulletin, vol. 14, No. 7, Dec. 1971.

*Primary Examiner*—Donald J. Yusko
*Attorney, Agent, or Firm*—Jack M. Arnold

[57] ABSTRACT

This is a communication loop system having a bidirectional transmission capability between terminals. The system is comprised of switching units which allow isolation of a loop segment and the establishment of an operable folded loop for the remaining non-isolated loop portions of the system. In addition, the communication loop system comprises devices for enabling synchronous switchover operation during reconfiguration of the loop. This synchronous switchover insures that no data stream interruption or disturbance occurs for the units or terminals not attached to the disconnected loop segment.

5 Claims, 12 Drawing Figures

FIG. 7
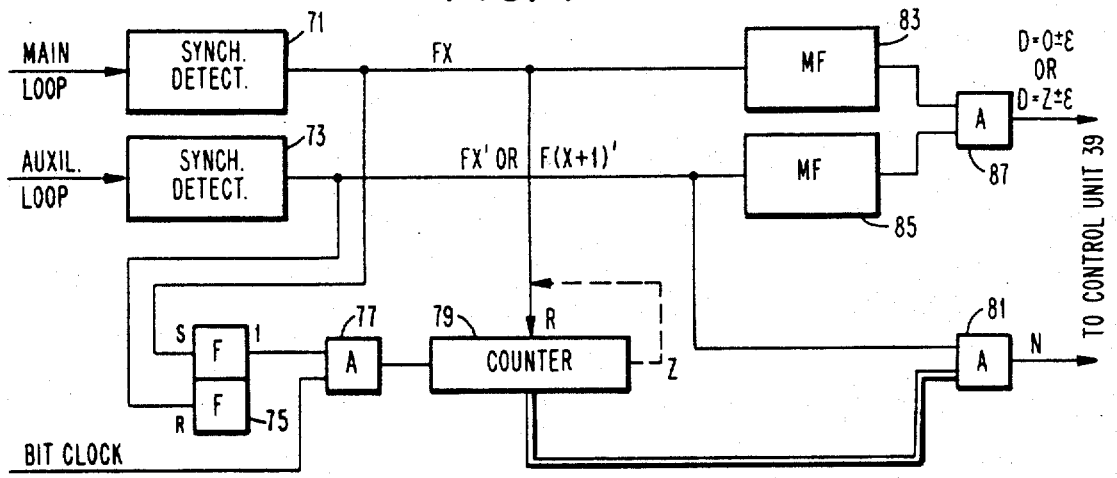
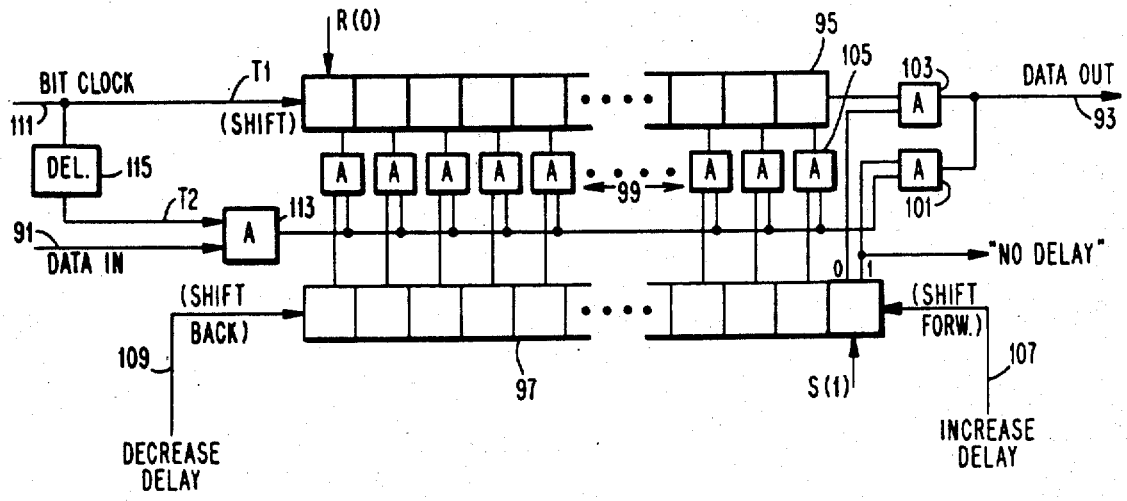
FIG. 8

SYNCHRONOUS DISCONNECTION AND REARRANGEMENT

Matter enclosed in heavy brackets [ ] appears in the original patent but forms no part of this reissue specification; matter printed in italics indicates the additions made by reissue.

BACKGROUND OF THE INVENTION

The present invention relates to a loop-structured communication system. More particularly, to a loop-structured communication system that is capable of disconnecting a selected loop section and rearranging the loop while maintaining synchronism of data stream on the loop.

Communication systems in the form of a closed loop in which numerous remote terminals are interconnected have the advantage of a saving in transmission lines and a favorable organization of the data traffic with the aid of time frames circulating on the loop. One problem present in such systems is the fact that when an interruption occurs in the communication loop, the total system is placed out of operation. Such interruptions may be caused by mechanical or electrical failures or by a disconnection of a loop section for maintenance or repair.

Systems are presently known in the art, which address the above problem by loop reconfiguration, thereby maintaining operability of the system with the exception of that part of the loop in which the interruption has occurred. In one of these prior art systems the communication loop consists of parallel lines on which data signals can circulate in opposite directions. The connection units at each terminal in this system provide the additional function of a switchover unit in which data signals can either be forwarded on the same line in the same direction or in which they can be retransferred from one line to the other line. Normally, data signals are transmitted over only one of these lines. If an interruption occurs the data stream is reversed in the connection units before and after the location of the interruption, so that with the aid of the second parallel line two folded loops are set up which together again form a closed loop.

In several other prior art systems, isolation of part of a communication loop with reconfiguration of the remaining closed loop is achieved with the aid of switchover units used in a similar manner as the connection units.

In all these prior art systems the data stream is temporarily interrupted due to the disconnection of a loop section, and part of the attached functional units or terminals are caused to fall out of synchronism. After completion of the new configurated loop the units must again be resynchronized and the system must determine which data was lost.

While such a procedure may be tolerated in some applications it is not acceptable in others. For example, in many process control systems data must be accepted or furnished within fixed time intervals. Otherwise, serious damage could result in the controlled facility.

OBJECTS OF THE INVENTION

Therefore, it is an object of the present invention to provide a loop-structured communication system which is capable of disconnecting a loop section without interruption of the data flow in the other parts of the loop.

It is a further object of the present invention to reconfigure a loop-structured communication system to exclude a loop section without noticeable effect on the attached terminals which are not part of disconnected loop sections.

SUMMARY OF THE INVENTION

In accordance with this invention a loop-structured communication system is subdivided by switchover units into a plurality of sections. Within the system data signals may circulate in both directions. The method of disconnection of selected loop sections is characterized in that in a first switchover unit, which terminates the selected loop section, the arriving data stream is duplicated and transmitted from the terminating point over the communication loop in both directions. Further, in a second switchover unit, terminating the selected loop section, the two identical data streams are monitored and synchronized by delaying the one arriving earlier. so that a switchover operation between these two data streams does not result in an interruption of data flow or disturbance of functional units which were receiving one of these two data systems.

In an exemplary embodiment switchover units are provided, each comprising a discriminator for determining the time difference between synchronizing characters arriving from two differnt directions. In addition, two delay devices are provided, through which data streams arriving from two directions must pass, and in which the delay can be increased or decreased stepwise, each time by one unit of time. The outputs of the delay units are connected to the inputs of the discriminator.

BRIEF DESCRIPTION OF THE DRAWINGS

FIG. 7 is a schematic representation of a discriminator for a switchover unit.

FIG. 8 is a schematic representation of a variable delay unit for a switchover unit.

DETAILED DESCRIPTION OF THE INVENTION

Figure 1:
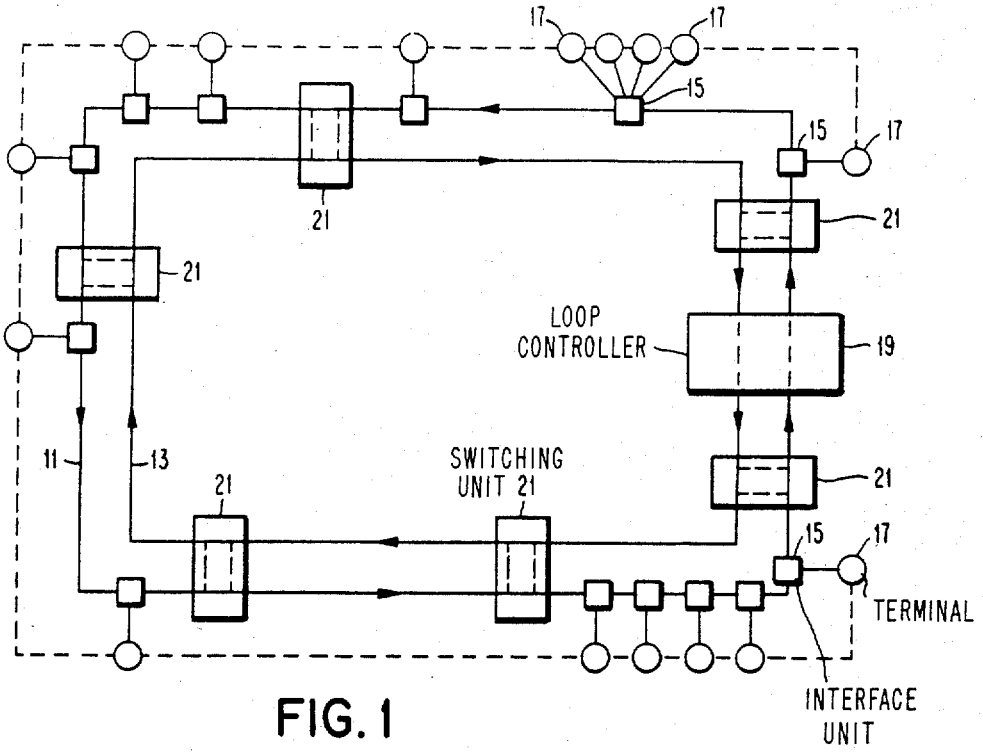
FIG. 1 is schematic representation of a loop-structured communication system.

Referring now to FIG. 1, there is shown a schematic diagram of a loop-structured communication system. The loop consists of two buses 11 and 13 each of which is a double line and can, for example, be contained in a common cable. The two buses 11 and 13 are designated as main loop 11 and auxiliary loop 13. The data flow direction in loop 11 is opposite that of auxiliary loop 13. A plurality of interface units 15 are attached to main loop 11. To each of these interface units either single terminal 17 or a group of terminals 17 is connected. Data which is transferred between terminals 17 circulate on main loop 11 in only one direction, as indicated by the arrows.

On auxiliary loop 13 data can only circulate in the opposite direction to that of loop 11. It serves as supplementary line for a reconfiguration of the communication loop, as is described in more detail further below. Furthermore, auxiliary loop 13 has no interface units or terminals connected to it.

Information is transferred on the lines in loop 11 in the form of frames. The beginning of each frame is constituted by a synchronizing bit pattern, by which the interface units 15 and other units of the communication system are synchronized for receiving a frame.

The loop controller 19 (LC) which is connected to main loop 11 and auxiliary loop 13 generates, in a regular sequence, empty frames which can be seized and used for transmission by the attached interface units 15 or terminals 17, respectively. The loop controller 19 also fulfills coordinating functions when errors occur or during switchover operations.

Figure 2:
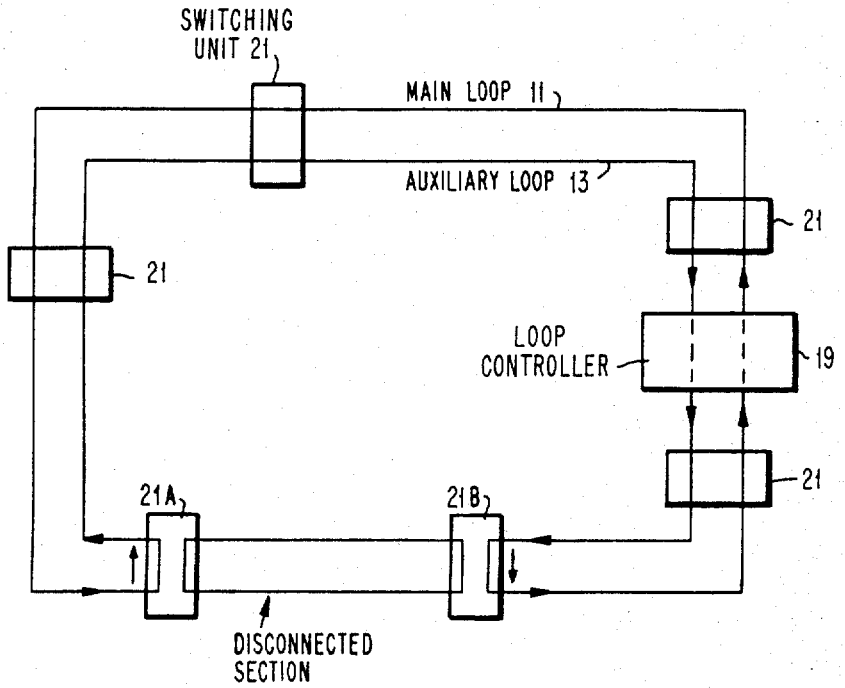
FIG. 2 is a representation of the system according to FIG. 1 after disconnection of a loop section.
Figure 3:
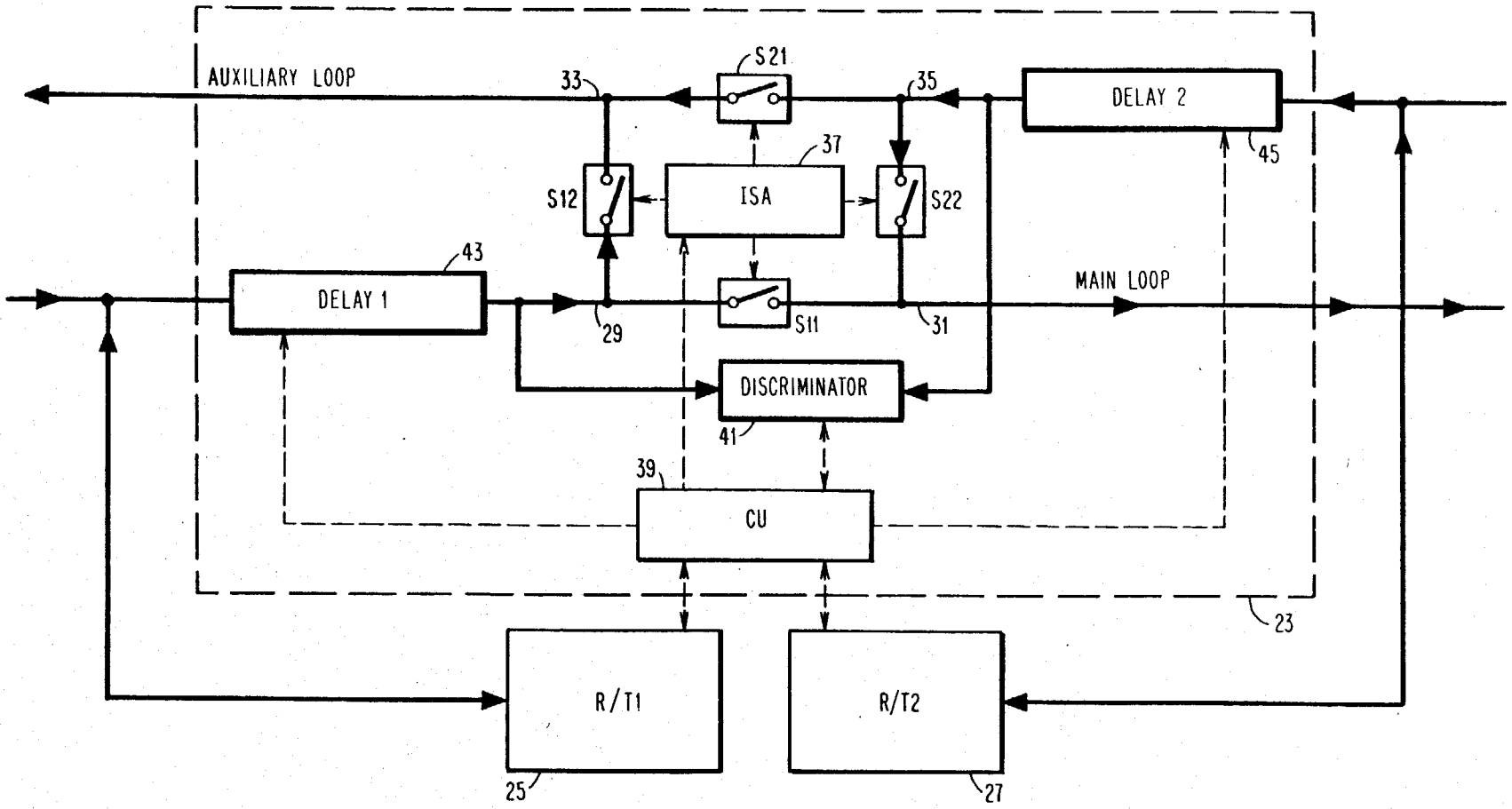
FIG. 3 is a schematic representation of switchover unit.
Figure 4:
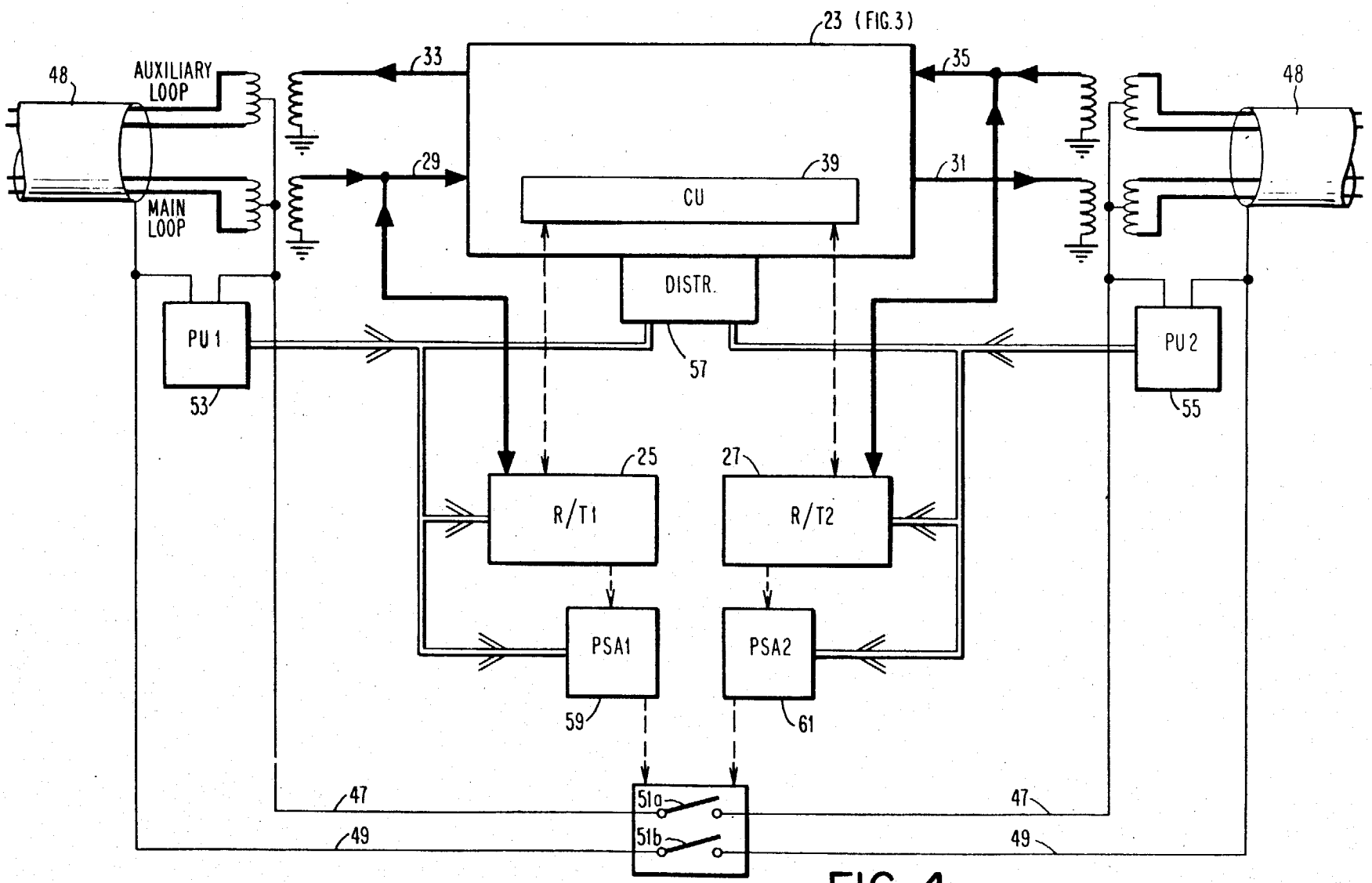
FIG. 4 is a schematic representation of a switchover unit comprising additional power units.

The combination of main loop 11 and auxiliary loop 13 is subdivided into sections by a number of switchover units 21. Each of these switchover units, which are described in more detail in connection with FIGS. 3 and 4, is connected to two sections of the main loop 11 and two sections of the auxiliary loop 13. A switchover unit 21 may, depending on its internal switch positions, either effect a through-connection for the main loop as well as for the auxiliary loop, or a transverse connection between a main loop section and an auxiliary loop section. Thus when an interruption of the loop lines occurs, or during service and maintenance, it is possible to disconnect a section of the complete loop structure and still maintain an operable closed communication loop, as is shown in FIG. 2. In this case, the complete communication loop consists of the following components: main loop from loop controller 19 to switchover unit 21A, auxiliary loop from switchover unit 21A through loop controller 19 to switchover unit 21B, and main loop from switchover unit 21B to loop controller 19.

In systems comprising a large number of terminals it is important that the data flow not be interrupted by a switchover operation. A short interruption cannot be avoided when a sudden breakdown occurs, such as, a mechanical loop rupture. In many situations, however, failures exhibit recognizable symptoms prior to occurance, so that disconnection of a section can be effected in a controlled manner without interruption of the data flow. In all cases of service and maintenance work the switchover operation should, of course, be a controlled procedure. The controlled switchover operation in the following description is referred to as "synchronous disconnection," or "synchronous reconnection."

The inventive procedure described herein enables switchover without data flow interruption. Specific switchover units 21 are used which will be described in more detail in connection with FIGS. 3 and 4.

Switchover Units

Each switchover unit 21 comprises synchronous switching circuitry 23, two receiver/transmitters 25 and 27, R/T1 and R/T2 respectively, as shown in FIG. 3. The means for power distribution and for through-connection or disconnection of power is shown in FIG. 4. In FIGS. 3 and 4, information transmission lines are shown as heavy lines, control lines as dashed lines, and power lines as thin lines.

Synchronous switching circuitry 23 contains four switches S11, S12, S21, S22 by which the main loop sections 29 and 31 and the auxiliary loop sections 33 and 35 can be selectively connected to each other. The position of each of the for switches S11, S12, S21 and S22 is determined by information switch actuator 37 (ISA) which is controlled by control unit 39 (CU). Control unit 39 receives commands from loop controller 19 either via the main loop 11 through receiver/-transmitter 25 or via the auxiliary loop 13 through receiver/transmitter 27. The control unit 39 may send messages through each one of the two receiver/transmitters to the loop controller 19.

A discriminator 41 is provided for determining the time difference (in the form of a bit period count) between arrivals of a frame on the main loop 11 and on the auxiliary loop 13. Variable delay units 43 and 45 which are connected to discriminator 41 (Delay 1 and Delay 2) are used for selectively introducing a delay of one or several bit periods either for the frames on the main loop 11 or for the frames on the auxiliry loop 13. The variable delay units 43 and 45 are controlled by control unit 39 to either increase or decrease the delay by one bit period for each time interval.

Power distribution or the conduction of power to all units is accomplished by utilization of the same lines that serve for information transmission. However, within each switchover unit 21 the power path is separate from the information path, as shown in FIG. 4. The middle taps of each of two transformers arranged in the main loop, or in the auxiliary loop respectively, are connected to the same power line 47 and the grounded screening cable 48 is connected to the other power line 49. Two power switches 51a and 51b are provided for interrupting lines 47 and 49. Note that these two switches are always actuated simultaneously.

Power units 53 and 55 (PU1 and PU2) provide power to all circuits of the switchover unit 21, particularly, to synchronous switching circuitry 23, via a power distributor 57 (DISTR) when one of the two neighboring loop sections is disconnected. Power switch actuators 59 and 61 (PSA1) and (PSA2) are controlled by receiver/transmitters 25 or 27, respectively, so that a command to interrupt or through-connect the power lines may be given from both the main loop or the auxiliary loop.

Synchronous Switchover Procedure

Figure 5A:
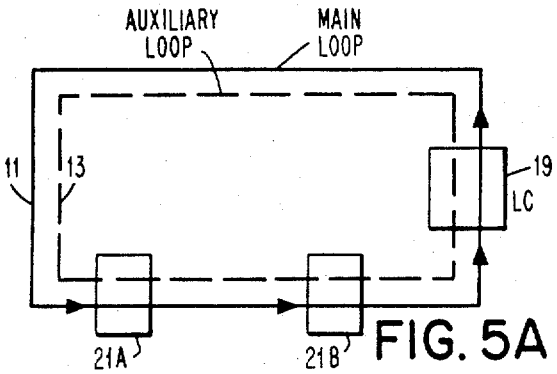
FIGS. 5A — 5D show various switchover states of the system.
Figure 5B:
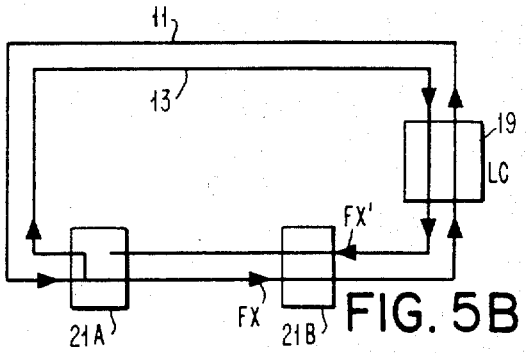
Figure 5C:
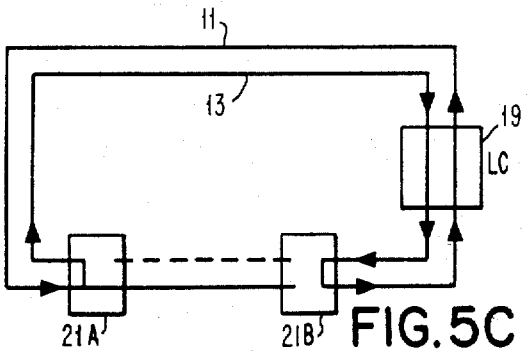
Figure 5D:
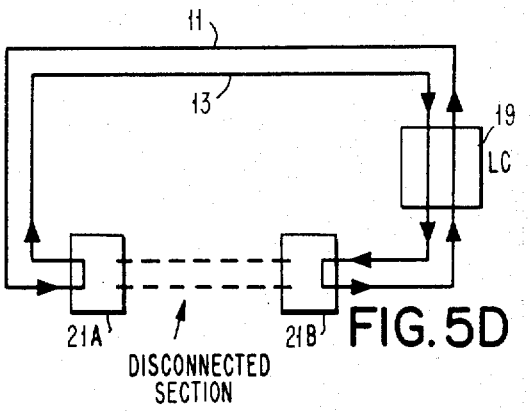
Figure 6A:
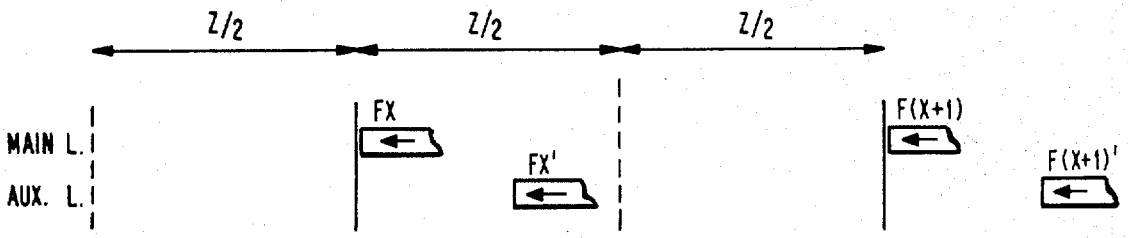
FIGS. 6A and 6B show a time diagram for illustrating the time difference between time frames arriving at a switchover unit.
Figure 6B:
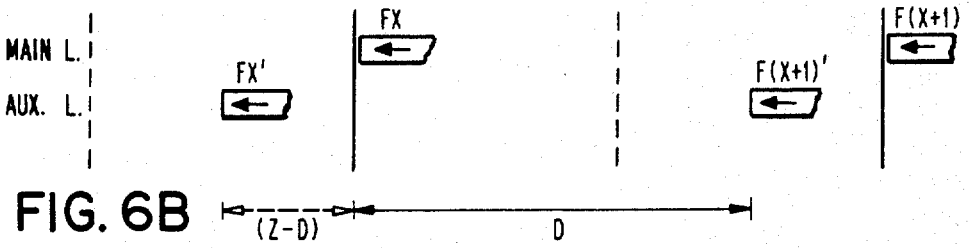

The switchover procedures is now described in connection with FIGS. 5A through 5D and FIGS. 6A and 6B. For the purpose of simplifying the following description, all units are omitted in FIG. 5 except for the loop conroller 19 and the two switchover units 21. The switchover units are designated as A and B, and are connected by a loop section that is to be disconnected and reconnected. FIG. 5A depicts the normal situation: all data traffic circulates over the main loop 11. The auxiliary loop 13 is not used. For the synchronous disconnection of the loop section between A and B, the main loop 11 initially connected to the auxiliary loop 13 in switchover unit A by closing switch S12. This results in a splitting of the data stream in switchover unit A, as shown in FIG. 5B. Identical data streams now proceed on the main loop 11 from A directly to B, and on the auxiliary loop 13 in an opposite direction from A, first to the loop controller, 19 and from there to switchover unit B, and further to a termination in A. Thus, the same data reaches unit B over two different paths, but probably not at the same time instant due to different propagation times. Therefore, as shown in FIGS. 6A and 6B the headers of two identical frames FX and FX′ have a time differential D (if FX arrives earlier) or a time differential Z-D (if FX′ arrives earlier) at unit B.

At this point, a delay is introduced in switchover unit B for the frames that arrive earlier, either in the main loop or in the auxiliary loop, until FX and FX′ meet in B. This causes the time difference between the two to be practically zero. Then, the synchronous switchover operation can be effected. Main loop 11 and auxiliary loop 13 are interrupted in unit B (opening of switches S11 and S21) and connected to each other (closing of switch S22), as shown in FIG. 5C. Thereafter, the main loop is also interrupted in unit A (opening of switch S11) which results in the loop as shown in FIG. 5D. Now, the loop section between A and B is disconnected, as required, but a closed communication loop exists for all other units of the system. Except in the disconnected section per se, the switchover operation did not disturb the data stream: the interface units and the terminals between unit B and the loop controller 19 cannot recognize whether the data reaching them came directly over the main loop or made the detour over the auxiliary loop, because the switchover was effected in synchronism.

Reconnection is achieved in an analogous manner to that described above for the disconnection. The individual steps of the disconnect and reconnect procedure are, however, presented at a further point in this specification.

It may be noted that switchover units A and B need not be immediate neighbors. The disconnected loop section may also contain switchover units. This will particularly be the case when a failure occurs in a switchover unit. For disconnecting this specific switchover unit the two neighboring loop sections must also be disconnected. Note that the combination of two basic loop sections and the intermediate switchover unit may also be called "loop section."

Discriminator and Delay Unit

Two devices in the switchover units 21 are of particular interest to the synchronous switchover operation. They are: the discriminator 41 for determining the time difference between the data streams on the main loop 11 and the auxiliary loop 13, and the variable delay units 43 or 45.

FIG. 7 shows the discriminator 41. It comprises two synchronization pattern detectors 71 and 73 which release a pulse after observing a synchronization pattern (1111′1111) on the main loop 11 or auxiliary loop 13, respectively. By these pulses, bistable device 75 is set and reset. Between the two synchronization pulses, bit clock pulses from control unit 39 are gated by AND gate 77 to counter 79. The counter 79 contents, N, represents the time difference between the frames in discrete form, i.e., in whole bit periods. When the synchronizing pulse from the auxiliary loop 13 appears, this value N is gated by AND gate 81 to control unit 39. The control unit 39 determines, by evaluating N, whether and in which one of the two delay units 43 and 45 the delay must be increased by one step (one bit period). The counter 79 has a capacity of Z units corresponding to one frame period. After counting Z pulses, the counter 79 contents return to zero. At the beginning of any counting period, when the synchronizing pulse from the main loop 11 appears, the counter 19 is reset to zero using input terminal R. It is assumed that the time difference between associated frames on the main loop and the auxiliary loop never exceeds Z/2, i.e., one-half frame period. It can be seen from FIGS. 6A and 6B that the data stream on the main loop 11 must be delayed if $D \leq Z/2$, and the data stream on the auxiliary loop 13 must be delayed if $D > Z/2$ (i.e., if $(Z-D) \leq Z/22$).

For a more precise comparison, two monostable circuits 83 and 85 (MF) and AND gate 87 are provided. After the time difference has been reduced to less than one bit period with the aid of the variable delay units 43 and 45, fine adjustment is effected by "wobbling." The loop controller 19 shifts, in consecutive frame cycles, the leading end of the frame on the auxiliary loop 13 each time by a fraction, for example, one tenth of a bit period. This is first done a few steps in positive sense, then in negative sense. Finally, the time difference D between the two synchronizing pulses is equal to zero or at most $\pm\epsilon$, $\epsilon$ being the "wobbling" unit. This state is detected by circuits 83, 85 and 87. Monostable circuits 83 and 85 have a delay time which corresponds to the allowable tolerance at switchover time. When AND gate 87 releases a pulse the switchover operation can be effected because both data streams are then synchronous within adequate accuracy.

A variable delay unit is shown in FIG. 8. With this circuitry data signals arriving on input line 91 may be forwarded to output line 93 either directly or with a selectable delay of an integer number of bit periods. The delay is achieved by having the data stream pass a variable number of stages of a data shift register 95. Selection of the one data shift register stage to which the data stream is applied as input is effected with the aid of a control shift register 97 and AND gates 99. Control shift register 97 always contains only one 1 bit, which is placed into the first stage at the beginning of each switchover operation. In this situation, AND gate 101 is "opened," AND gate 103 is "closed," and the incoming data passes at the rate of the bit clock directly from the input line to the output line.

If a delay is to be introduced, a pulse is furnished to line 107 shifting the 1 bit in register 97 to the left by one stage. Thereafter, AND gate 101 is "closed," AND gates 103 and 105 are "opened." Each data bit now proceeds first from input line 91 through AND gates 113 and 105 into the last stage of register 95, and only at the next bit clock time, with a delay of one bit period, is it forwarded to output line 93 by a pulse on line 111. The delay can be increased or decreased stepwise by control pulses on lines 107 or 109, respctively, but only by one bit period (one step) during each frame cycle.

Delay circuit 115 is shown to indicate that during each bit period the contents of register 95 is first shifted before a new bit is inserted from input 91, so that no data is lost. It should be recognized that it is possible to not provide a delay circuit 115 but rather a plurality of bit clock signals T1, T2, etc., having a phase shift against each other of a fraction of a bit period. Clock signals are derived from the data stream by control unit 39.

Control signals for changing the delay must be furnished by control unit 39 to line 107 or 109, respectively, before the last four bits of the synchronization pattern appear. Data shift register 95 is filled with zeros at the beginning of each switchover operation (input R).

Normally, the loop controller 19 furnishes synchronization patterns 1111'1111. When the delay is increased in switchover unit B, a zero bit is released by that stage of the data shift register 95 which is additionally introduced into the data path so that all facilities after the respective switchover unit B receive the synchronization pattern 1111'0'1111. All circuits are equipped to recognize both synchronization patterns.

After a switchover operation the delay is eliminated while the loop controller, on exception, furnishes synchronization patterns 1111'0'1111. In the respective delay unit, in which the control bit in register 97 is shifted to the right by one stage each time before the last four synchronization bits are received, the zero bit is lost so that all facilities after the respective switchover unit receive normal synchronization patterns 1111'1111.

| Events During Synchronous Switchover Operations |
|---|
| Abbreviations used: |
| A = switchover unit A (21) |
| B = switchover unit B (21) |
| LC = loop controller (19) |
| DEL1/DEL2 = delay unit (43/45) |
| CU = control unit (39) |

Assumptions

At the beginning of the disconnect procedure main loop 11 and auxiliary loop 13 are through-connected, transverse connections are interrupted (in all switchover units S11 and S21 are closed, S12 and S22 are opened, as shown in FIG. 3).

At the beginning of the reconnect procedure one transverse connection is closed and all other connections are interrupted in A and B (in A, S12 is closed, S11 and S21 and S22 are opened/in B, S22 is closed, S11 and S12 and S21 are opened).

The time difference between frame headers on main loop and auxiliary loop (between FX and FX') never exceeds $\pm Z/2$, whereby Z = frame cycle time.

N = counting value which represents the time difference D between FX and FX' or F(X+1)', respectively, in discrete values of integer bit periods.

During normal operation the bit combination 1111'1111 is transmitted as a synchronization pattern at the beginning of each frame.

I. Disconnection of a Loop Section

1. Command from LC
   a. to A: Close S12/Open S21
   b. to B: Monitor time difference between both data streams/stepwise delay the one arriving earlier/-switchover when synchronous.
2. In LC: Start wobbling the data stream on auxiliary loop (periodic shifting of frame start in each cycle by 0.1 bit periods, first in positive then in negative sense and so on, deviation with respect to normal start time at most one bit period in positive and in negative sense).
3. In B:
   a. If $N \leq Z/2$ (corresponding to $D \leq Z/2$), i.e., data stream on main loop earlier: Increase delay in DELI by one unit during next frame cycle.

b. If $N > Z/2$ (corresponding to $D > Z/2$), Increase delay in DEL 2 by one unit during next frame cycle.
   c. If N = 0 (identical to N = Z because counter 69 operates modulo Z): No change in delay.
4. in B: When $D = 0 \pm \epsilon$ or $D = Z \pm \epsilon$, respectively: Pulse from AND gate 87 to CU, causing opening of S11 and S21/closing of S22/opening of power switches (51a, 51b).
5. Message from B to LC: Switchover operation in B completed.
6. Command from LC to A: Open S11/open power switches (51a, 51b).
7. In RS:
   a. Stop wobbling operation
   b. Start transmitting 1111'0'1111 as synchronization pattern (instead of 1111'1111)
8. Command from RS to B: Stepwise decrease delay in DEL1 or DEL2.
9. In B: During each frame cycle one pulse on line 109 to control shift register 97 of the delay unit 43 or 45 used previously, to effect backwards shifting of 1 bit until it reaches starting position, that is, until delay is zero.
10. Message from B to RS: Delay in B eliminated.
11. In RS: Start transmitting 1111'1111 as synchronization pattern (instead 1111'0'1111).

II. Reconnection of Loop Section

1. Command from LC.
   a. to A: Close S11/Close power switches 51a, 51b.
   b. to B: Close power switches 51a, 51b/monitor time difference between both data streams/stepwise delay the one arriving earlier/switchover when synchronous.

2.
3. } Same as under I (Disconnection)

4. In B: When $D=0\pm\epsilon$ or $D=Z\pm\epsilon$: Pulse from AND gate 87 to CU, causing opening of S22/closing of S11 and S21.
5. Message from B to LC: Switchover operation in B completed.
6. Command from LC to A: Open S12.

7.
8.
9.
10.
11. } Same as under I (Disconnection)

As already indicated above, the loop section to be disconnected or reconnected can be a block of several consecutive basic loop sections together with intermediate switchover units. Switchover units A and B need not be immediate neighbors.

The structure depicted in FIG. 1 could be topologically realized in such a manner that switchover units 21 are all located in close proximity to loop controller 19, whereas each loop section between two switchover units would be a far extending variable size loop of large dimensions. The ring structure FIG. 1 would be preserved but loop controller 19 and switchover units 21 are concentrated in a central location and the lines are deformed to a plurality of large variable size loops each beginning at the central station and leading back to it.

In the above described embodiment the loop structure consists of two parallel double lines on which data signals propagate in opposite directions, but on any one of these two double lines always in only one direction. The switchover principle of the invention is, however, also applicable to a loop structure comprising only one double line on which data can propagate in both directions. This means that main loop 11 and auxiliary loop 13 coincide; before and after each switchover unit, or within each switchover unit at both ends. Additional split connection circuitry must be provided, in this case, by which signals can be separated for the two directions. Such split connection circuits are well known in communication technology and need not be described here. The above described components of the switchover units remain the same in such an alternative solution, as well as the complete switchover procedure for disconnection or reconnection.

Switchover Procedure in the Case of Suddenly Occurring Failure

With the described switchover units and loop structures which transmit information as well as power over the same conductors it is also possible according to the following, to determine the location of a suddenly occurring failure which inhibits further operation of the system, (for example, a short circuit) and to isolate the corresponding loop section. After power failure or power switch-off, the information switches in each switchover unit initially assume such a position that longitudinal connections are interrupted (S11 and S21 opened) and transverse connections are established (S12 and S22 closed); also the power switches 51a, 51b must initially be automatically opened. In this initial situation, only two small partial loops are operable extending between the loop controller 19 and the two next switchover units 21 on both sides. After each switching-off and subsequent switching-on of the power, one further basic loop section must be automatically added to the existing partial loop by suitable positioning of switches such that the partial loop is augmented. During this procedure any newly set-up partial loop is tested for operability until the faulty loop section is recognized. In the final reconfiguration of the total communication system this loop section will then not be reconnected. Thus, a fault localization and an elimination of the faulty area is possible in an easy manner by a multiple switching-on of the power.

What is claimed is:

1. A loop-structured communication system comprising:

a main loop and an auxiliary loop parallel to each other each capable of circulating data signals in one of two possible directions opposite to each other;

a plurality of switchover units each connected at various positions in said loops for subdividing said loops into a plurality of loop sections;

a loop controller connected to said loops for controlling the data flow circulating in said loops;

delay means present in each of said switchover units for synchronizing the data flow between said main loop and said auxiliary loop when one or more of said loop sections is disconnected from the remainder of said loops.

2. The system as defined in claim 1 wherein said switchover unit further comprises:

switch means for interconnecting said main loop to said auxiliary loop to permit data flow between said main loop and said auxiliary loop;

control means for controlling said switch means to effect a particular interconnection of said main loop with said auxiliary loop.

3. The system as defined in claim 2 wherein said switchover unit further comprises:

discriminator means for determining the time difference between the data stream circulating on said main loop and the data stream circulating on said auxiliary loop.

4. The system as defined in claim 3 wherein said delay means further comprises:

first and second delay means connected to said main loop and auxiliary loop respectively and to said discriminator means for selectively introducing a delay in either said main loop or said auxiliary loop so as to minimize the time difference between said data streams.

5. The system as defined in claim 4 wherein said control means further comprises:

means for detecting synchronization patterns transmitted by said loop controller and generating a pulse for each detection of a synchronization pattern;

counter means connected to said detection means for counting bit clock pulses between said pulses;

means connected to said counter means for determining whether a delay is to be imparted by said first or second delay means.

* * * * *